US012574232B2

(12) United States Patent
Pinto et al.

(10) Patent No.: US 12,574,232 B2
(45) Date of Patent: Mar. 10, 2026

(54) SYSTEMS AND METHODS FOR ASYNCHRONOUS EVENT-BASED API CALLBACK

(71) Applicant: Truist Bank, Charlotte, NC (US)

(72) Inventors: Glenn Pinto, Charlotte, NC (US); Sanjeev Gharmode, Charlottte, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/822,570

(22) Filed: Sep. 3, 2024

(65) Prior Publication Data

US 2026/0067080 A1     Mar. 5, 2026

(51) Int. Cl.
*H04L 9/08*     (2006.01)
(52) U.S. Cl.
CPC ................................... *H04L 9/088* (2013.01)
(58) Field of Classification Search
CPC ....................................................... H04L 9/088
See application file for complete search history.

(56) References Cited

U.S. PATENT DOCUMENTS

| | | | | |
|---|---|---|---|---|
| 12,316,621 | B1 * | 5/2025 | Mohassel | H04L 63/0421 |
| 12,399,983 | B1 * | 8/2025 | Bevis | G06F 21/575 |
| 2022/0012358 | A1 * | 1/2022 | Gaddam | H04L 9/3247 |
| 2024/0048971 | A1 * | 2/2024 | Giura | H04W 12/03 |
| 2024/0171564 | A1 * | 5/2024 | Fynaardt | H04L 63/0823 |
| 2024/0348605 | A1 * | 10/2024 | Quinlan | H04L 9/3213 |
| 2024/0370765 | A1 * | 11/2024 | Pierucci | G06F 40/30 |
| 2025/0016262 | A1 * | 1/2025 | Spindler | H04W 12/06 |
| 2025/0053683 | A1 * | 2/2025 | Hockey | H04L 63/0853 |
| 2025/0055700 | A1 * | 2/2025 | Clark | H04L 9/3271 |
| 2025/0094250 | A1 * | 3/2025 | Bath | G06F 16/288 |
| 2025/0112783 | A1 * | 4/2025 | Sprague | H04L 9/50 |
| 2025/0147712 | A1 * | 5/2025 | Li | G06F 3/1423 |
| 2025/0167982 | A1 * | 5/2025 | Rezaei | H04L 9/3226 |
| 2025/0181599 | A1 * | 6/2025 | Aucinas | H04L 63/20 |
| 2025/0220002 | A1 * | 7/2025 | Nambula | H04L 9/3268 |
| 2025/0247676 | A1 * | 7/2025 | Lopatin | H04W 4/06 |
| 2025/0260697 | A1 * | 8/2025 | Charlson | H04L 63/0227 |
| 2025/0279894 | A1 * | 9/2025 | Small | H04L 9/3231 |
| 2025/0284609 | A1 * | 9/2025 | Rivera | G06F 11/3055 |
| 2025/0292252 | A1 * | 9/2025 | Kunz | G06Q 20/14 |
| 2025/0310762 | A1 * | 10/2025 | Lehtovirta | H04W 12/041 |

* cited by examiner

*Primary Examiner* — Stephen T Gundry
(74) *Attorney, Agent, or Firm* — Jordan IP Law LLC; Michael A. Springs, Esq.

(57)     ABSTRACT

A method, computer program product, and computer system for receiving, at a computing device, a request for data from a client electronic device. It may be determined that the data is not currently available upon receiving the request for the data. It may be determined that an event associated with the data has been triggered, wherein the event indicates availability of the data. A message containing the data may be transmitted to the client electronic device, wherein the message containing the data is asynchronously transmitted to the client electronic device based upon, at least in part, triggering of the event.

12 Claims, 4 Drawing Sheets

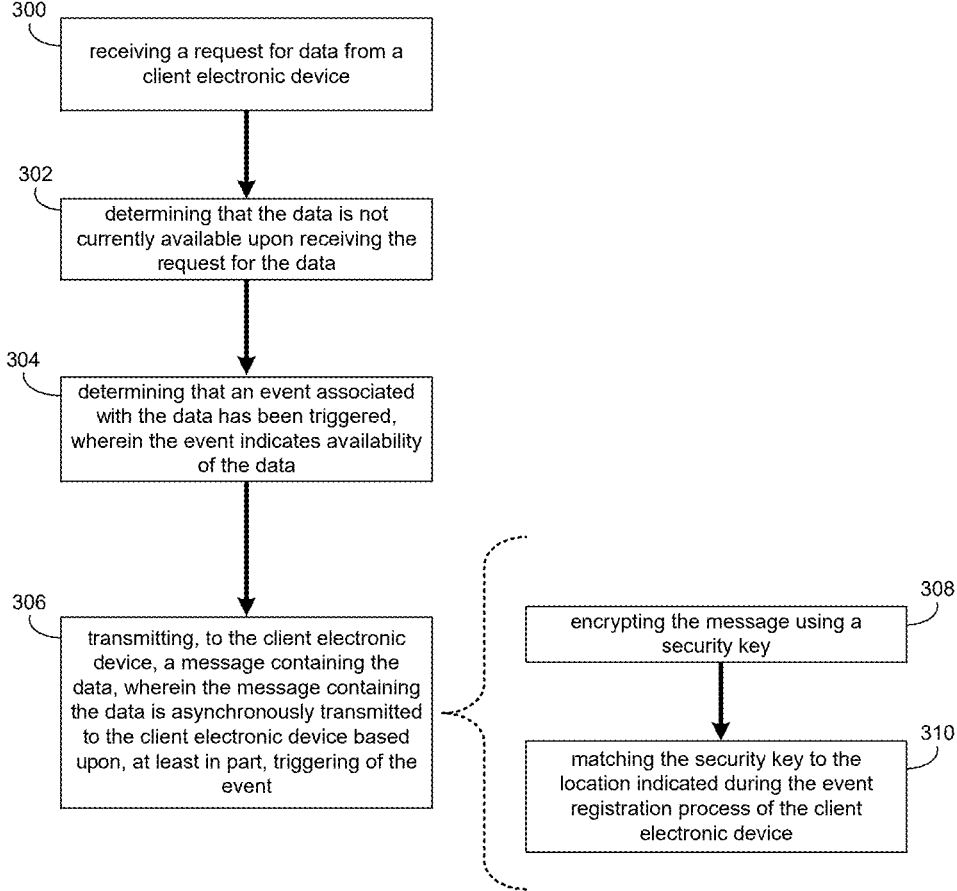

300 receiving a request for data from a client electronic device

302 determining that the data is not currently available upon receiving the request for the data

304 determining that an event associated with the data has been triggered, wherein the event indicates availability of the data

306 transmitting, to the client electronic device, a message containing the data, wherein the message containing the data is asynchronously transmitted to the client electronic device based upon, at least in part, triggering of the event

308 encrypting the message using a security key

310 matching the security key to the location indicated during the event registration process of the client electronic device

FIG. 3

SYSTEMS AND METHODS FOR ASYNCHRONOUS EVENT-BASED API CALLBACK

TECHNICAL FIELD

The present disclosure relates to processing event-based callback requests over a network, and more particularly, to processing event-based callback requests over a network to communicate data payloads to clients using message queues with enhanced security.

BACKGROUND

When a client request for information is made to a service provider, that information may not yet be known. Typically, when that happens, the client request for information may get timed out, or an error message may be received. Continuously sending client requests for the information until it is known may drain available resources, and may be frustrating for the requestor.

SUMMARY

In one example implementation, a computer-implemented method, performed by one or more computing devices, may include but is not limited to receiving, at a computing device, a request for data from a client electronic device. It may be determined that the data is not currently available upon receiving the request for the data. It may be determined that an event associated with the data has been triggered, wherein the event indicates availability of the data. A message containing the data may be transmitted to the client electronic device, wherein the message containing the data is asynchronously transmitted to the client electronic device based upon, at least in part, triggering of the event.

One or more of the following example features may be included. The request for data may be sent from an application programming interface (API) of the client electronic device and received by an API of the computing device. The message containing the data may be transmitted to the client electronic device at a location indicated during an event registration process of the client electronic device. Transmitting the message containing the data may include encrypting the message using a security key. Transmitting the message containing the data may include matching the security key to the location indicated during the event registration process of the client electronic device. The request for the data may include the security key. The security key may be generated during the event registration process of the client electronic device.

In another example implementation, a computing system may include one or more processors and one or more memories configured to perform operations that may include but are not limited to receiving, at a computing device, a request for data from a client electronic device. It may be determined that the data is not currently available upon receiving the request for the data. It may be determined that an event associated with the data has been triggered, wherein the event indicates availability of the data. A message containing the data may be transmitted to the client electronic device, wherein the message containing the data is asynchronously transmitted to the client electronic device based upon, at least in part, triggering of the event.

One or more of the following example features may be included. The request for data may be sent from an application programming interface (API) of the client electronic device and received by an API of the computing device. The message containing the data may be transmitted to the client electronic device at a location indicated during an event registration process of the client electronic device. Transmitting the message containing the data may include encrypting the message using a security key. Transmitting the message containing the data may include matching the security key to the location indicated during the event registration process of the client electronic device. The request for the data may include the security key. The security key may be generated during the event registration process of the client electronic device.

In another example implementation, a computer program product may reside on a computer readable storage medium having a plurality of instructions stored thereon which, when executed across one or more processors, may cause at least a portion of the one or more processors to perform operations that may include but are not limited to receiving, at a computing device, a request for data from a client electronic device. It may be determined that the data is not currently available upon receiving the request for the data. It may be determined that an event associated with the data has been triggered, wherein the event indicates availability of the data. A message containing the data may be transmitted to the client electronic device, wherein the message containing the data is asynchronously transmitted to the client electronic device based upon, at least in part, triggering of the event.

One or more of the following example features may be included. The request for data may be sent from an application programming interface (API) of the client electronic device and received by an API of the computing device. The message containing the data may be transmitted to the client electronic device at a location indicated during an event registration process of the client electronic device. Transmitting the message containing the data may include encrypting the message using a security key. Transmitting the message containing the data may include matching the security key to the location indicated during the event registration process of the client electronic device. The request for the data may include the security key. The security key may be generated during the event registration process of the client electronic device.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DRAWINGS

FIG. 3 is an example flowchart of a callback process according to one or more example implementations of the disclosure.

Like reference symbols in the various drawings indicate like elements.

DESCRIPTION

System Overview

Figure 1:
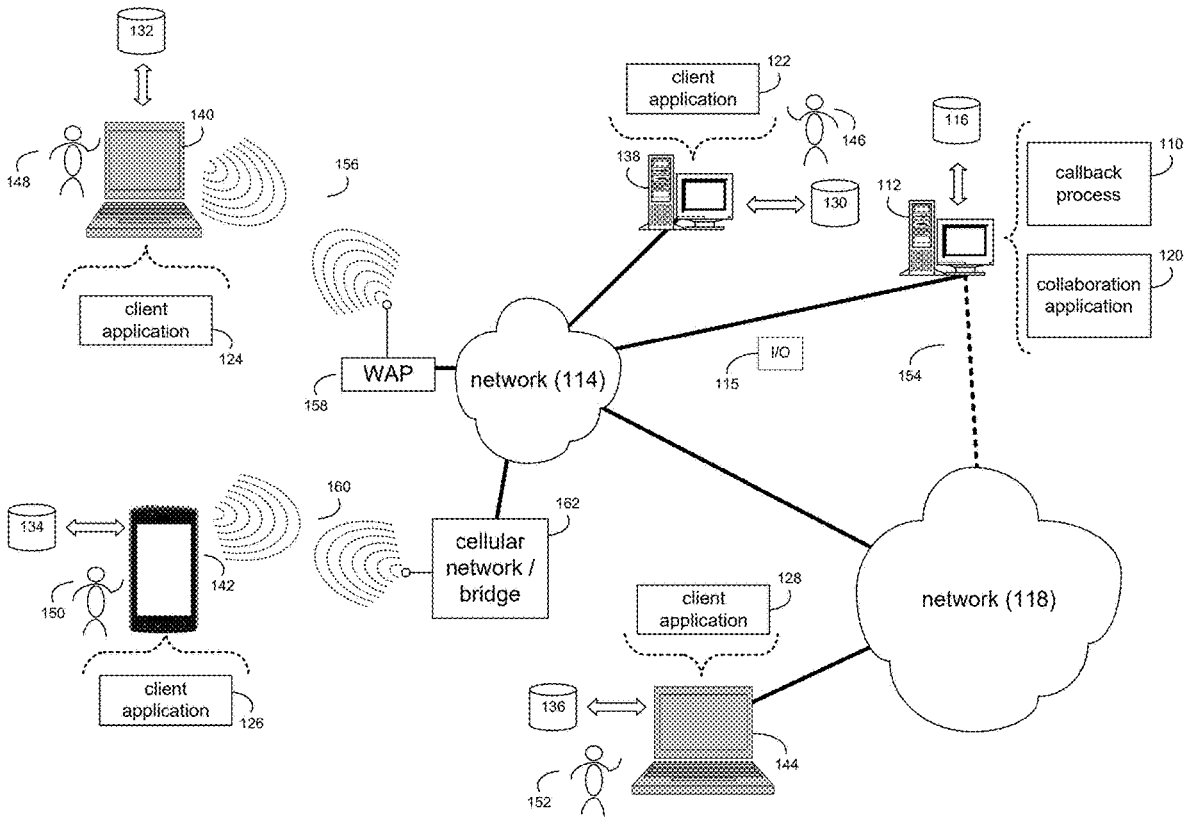
FIG. 1 is an example diagrammatic view of a callback process coupled to an example distributed computing network according to one or more example implementations of the disclosure.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

Software may include artificial intelligence (AI) systems, which may include machine learning or other computational intelligence. For example, AI may include one or more models used for one or more problem domains. When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs.

In some implementations, the various computing devices may include, integrate with, link to, exchange data with, be governed by, take inputs from, and/or provide outputs to one or more AI systems, which may include models, rule-based systems, expert systems, neural networks, deep learning systems, supervised learning systems, robotic process automation systems, natural language processing systems, intelligent agent systems, self-optimizing and self-organizing systems, and others. Except where context specifically indicates otherwise, references to AI, or to one or more examples of AI, should be understood to encompass one or more of these various alternative methods and systems; for example, without limitation, an AI system described for enabling any of a wide variety of functions, capabilities and solutions described herein (such as optimization, autonomous operation, prediction, control, orchestration, or the like) should be understood to be capable of implementation by operation on a model or rule set; by training on a training data set of human tag, labels, or the like; by training on a training data set of human interactions (e.g., human interactions with software interfaces or hardware systems); by training on a training data set of outcomes; by training on an AI-generated training data set (e.g., where a full training data set is generated by AI from a seed training data set); by supervised learning; by semi-supervised learning; by deep learning; or the like. For any given function or capability that is described herein, neural networks of various types may be used, including any of the types described herein, and in embodiments a hybrid set of neural networks may be selected such that within the set a neural network type that is more favorable for performing each element of a multi-function or multi-capability system or method is implemented. As one example among many, a deep learning, or black box, system may use a gated recurrent neural network for a function like language translation for an intelligent agent, where the underlying mechanisms of AI operation need not be understood as long as outcomes are favorably perceived by users, while a more transparent model or system and a simpler neural network may be used for a system for automated governance, where a greater understanding of how inputs are translated to outputs may be needed to comply with regulations or policies.

Examples of the models (e.g., AI-based models) include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformers (GPT). Training a machine-learning model (or other type of AI-based learning models) may include supervised learning (for example, based on labelled input data), unsupervised learning, and reinforcement learning. In various embodiments, a machine-learning model may be pre-trained by their operator or by a third party. Problem domains include nearly any situation where structured data can be collected, and includes natural language processing (NLP), including natural language understanding (NLU), computer vision (CV), classification, image recognition, etc. Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc. Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model.

In some implementations, as noted above, AI-based learning models may include at least one of a transformer model, a convolutional neural network, a deep learning model trained on a set of outcomes of the value chain network entity, a supervised model, a semi-supervised model, an unsupervised model, or a reinforcement model, and the training data set for the AI-based learning models may include one or a set of objects or events that are labeled to classify the set of objects or events according to a classification taxonomy. Other examples of AI-based learning models (e.g., machine learning models) may include neural networks in general (e.g., deep neural networks, convolution neural networks, and many others), regression-based models, decision trees, hidden forests, Hidden Markov models, Bayesian models, and the like. In some implementations, the present disclosure may include combinations where an expert system uses one neural network for classifying an item and a different (or the same) neural network for predicting a state of the item.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electro-magnetic, infrared, or semiconductor system, apparatus, device, or any suitable combination of the foregoing. More specific examples (a non-exhaustive list) of the computer-readable medium or storage device may include the follow-ing: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, solid state drives (SSDs), a digital versatile disk (DVD), a Blu-ray disc, and an Ultra HD Blu-ray disc, a static random access memory (SRAM), dynamic RAM (DRAM), synchronous DRAM (SDRAM), synchronous graphics RAM (SGRAM), and video RAM (VRAM), analog magnetic tape, digital magnetic tape, rotating hard disk drive (HDDs), a memory stick, a floppy disk, a mechanically encoded device such as punch-cards or raised structures in a groove having instruc-tions recorded thereon, a media such as those supporting the internet or an intranet, or a magnetic storage device. Note that the computer-usable or computer-readable medium could even be a suitable medium upon which the program is stored, scanned, compiled, interpreted, or otherwise pro-cessed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

Examples of storage implemented by the storage hard-ware include a distributed ledger, such as a permissioned or permissionless blockchain. Entities recording transactions, such as in a blockchain, may reach consensus using an algorithm such as proof-of-stake, proof-of-work, and proof-of-storage. Elements of the present disclosure may be rep-resented by or encoded as non-fungible tokens (NFTs). Ownership rights related to the non-fungible tokens may be recorded in or referenced by a distributed ledger. Transac-tions initiated by or relevant to the present disclosure may use one or both of fiat currency and cryptocurrencies, examples of which include bitcoin and ether.

In some implementations, a computer readable signal medium may include a propagated data signal with com-puter readable program code embodied therein, for example, in baseband or as part of a carrier wave. In some imple-mentations, such a propagated signal may take any of a variety of forms, including, but not limited to, electromag-netic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can commu-nicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, state information that personalizes electronic circuitry and/or other structural components that are native to hard-ware (e.g., host processor, central processing unit/CPU, microcontroller, etc.) or either source code or object code written in any combination of one or more programming languages, including an object oriented programming lan-guage such as Java®, Smalltalk, C++ or the like. Java® and all Java-based trademarks and logos are trademarks or registered trademarks of Oracle and/or its affiliates. How-ever, the computer program code for carrying out operations of the present disclosure may also be written in conventional procedural programming languages, such as the "C" pro-gramming language, PASCAL, or similar programming languages, as well as in scripting languages such as JavaScript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a network, such as a cellular network, local area network (LAN), a wide area network (WAN), a body area network BAN), a personal area network (PAN), a metro-politan area network (MAN), etc., or the connection may be made to an external computer (for example, through the internet using an Internet Service Provider). The networks may include one or more of point-to-point and mesh tech-nologies. Data transmitted or received by the networking components may traverse the same or different networks. Networks may be connected to each other over a WAN or point-to-point leased lines using technologies such as Mul-tiprotocol Label Switching (MPLS) and virtual private net-works (VPNs), etc. In some implementations, electronic circuitry including, for example, programmable logic cir-cuitry, an application specific integrated circuit (ASIC), gate arrays such as field-programmable gate arrays (FPGAs) or other hardware accelerators, microcontroller units (MCUs), or programmable logic arrays (PLAs), integrated circuits (ICs), digital circuit elements, analog circuit elements, com-binational logic circuits, digital signal processors (DSPs), complex programmable logic devices (CPLDs), memory chips, network chips, systems on chip (SoCs), SSD/NAND controller ASICs, and the like, etc. may execute the com-puter readable program instructions/code by utilizing state information of the computer readable program instructions to personalize the electronic circuitry, in order to perform aspects of the present disclosure. Configurable or fixed-functionality logic may be implemented with complemen-tary metal oxide semiconductor (CMOS) logic circuits, transistor-transistor logic (TTL) logic circuits, or other cir-cuits. Multiple components of the hardware may be inte-grated, such as on a single die, in a single package, or on a single printed circuit board or logic board. For example, multiple components of the hardware may be implemented as a system-on-chip. A component, or a set of integrated components, may be referred to as a chip, chipset, chiplet, or chip stack. Examples of a system-on-chip include a radio frequency (RF) system-on-chip, an AI system-on-chip, a video processing system-on-chip, an organ-on-chip, a quan-tum algorithm system-on-chip, etc.

Examples of processing hardware may include, e.g., a central processing unit (CPU), a graphics processing unit (GPU), an accelerator (e.g., an AI accelerator), an approxi-mate computing processor, a quantum computing processor, a parallel computing processor, a neural network processor, a signal processor, a digital processor, an analog processor, a data processor, an embedded processor, a microprocessor, and a co-processor. The co-processor may provide additional processing functions and/or optimizations, such as for speed or power consumption. Examples of a co-processor include a math co-processor, a graphics co-processor, a communication co-processor, a video co-processor, and an AI co-processor.

In some implementations, the AI accelerator may include suitable logic, circuitry, and/or interfaces to accelerate artificial intelligence applications, such as, e.g., artificial neural networks, machine vision and machine learning applications, including through parallel processing techniques. In one or more examples, the AI accelerator may include hardware logic or devices such as, e.g., a GPU or an FPGA. The AI accelerator may be used with any of the devices, components, features or methods described herein.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved. In addition, in some of the drawings, signal conductor lines may be represented with lines. Some may be different, to indicate more constituent signal paths, have a number label, to indicate a number of constituent signal paths, and/or have arrows at one or more ends, to indicate primary information flow direction(s). This, however, should not be construed in a limiting manner. Rather, such added detail may be used in connection with one or more implementations to facilitate ease of understanding. Any represented lines, whether or not having additional information, may actually comprise one or more signals/information that may travel in multiple directions and may be implemented with any suitable type of signal scheme, e.g., digital or analog lines implemented with differential pairs, optical fiber lines, and/or single-ended lines, etc.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown callback process 110 that may reside on and may be executed by a computer (e.g., computer 112), which may be connected to a network (e.g., network 114) (e.g., the internet or a local area network). Examples of computer 112 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). A SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 112 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a callback process, such as callback process 110 of FIG. 1, may receive, at a computing device, a request for data from a client electronic device. It may be determined that the data is not currently available upon receiving the request for the data. It may be determined that an event associated with the data has been triggered, wherein the event indicates availability of the data. A message containing the data may be transmitted to the client electronic device, wherein the message containing the data is asynchronously transmitted to the client electronic device based upon, at least in part, triggering of the event.

In some implementations, the instruction sets and subroutines of callback process 110, which may be stored on storage device, such as storage device 116, coupled to computer 112, may be executed by one or more processors and one or more memory architectures included within computer 112. In some implementations, storage device 116 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 116 may be organized as an extent, an extent pool, a RAID extent (e.g., an example 4D+1 P R5, where the RAID extent may include, e.g., five storage device extents that may be allocated from, e.g., five different storage devices), a mapped RAID (e.g., a collection of RAID extents), or combination thereof.

In some implementations, network 114 may be connected to one or more secondary networks (e.g., network 118), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 112 may include a data store, such as a database (e.g., relational database, object-oriented database, triplestore database, etc.), a data store, a data lake, a column store, and/or a data warehouse, and may be located within any suitable memory location, such as storage device 116 coupled to computer 112. In some implementations, data, metadata, information, etc. described throughout the present disclosure may be stored in the data store. In some implementations, computer 112 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, callback process 110 may be a component of the data store, a standalone application that interfaces with the above noted data store and/or an applet/application that is accessed via client applications 122, 124, 126, 128. In some implementations, the above noted data store may be, in whole or in part, distributed in a cloud computing topology. In this way, computer 112 and storage device 116 may refer to multiple devices, which may also be distributed throughout the network.

In some implementations, computer 112 may execute a collaboration application (e.g., collaboration application 120), examples of which may include, but are not limited to, e.g., a web conferencing application, a video conferencing application, a telephony application, a voice-over-IP application, a video-over-IP application, an Instant Messaging (IM)/"chat" application, a chatbot application, an interactive voice response (IVR) application, a short messaging service (SMS)/multimedia messaging service (MMS) application, a subscription based messaging service, an electronic mail (email) application, or other application that allows for remote collaboration and/or messaging. In some implementations, callback process 110 and/or collaboration application 120 may be accessed via one or more of client applications 122, 124, 126, 128. In some implementations, callback process 110 may be a standalone application, or may be an applet/application/script/extension that may interact with and/or be executed within collaboration application 120, a component of collaboration application 120, and/or one or more of client applications 122, 124, 126, 128. In some implementations, collaboration application 120 may be a standalone application, or may be an applet/application/script/extension that may interact with and/or be executed within callback process 110, a component of callback process 110, and/or one or more of client applications 122, 124, 126, 128. In some implementations, one or more of client applications 122, 124, 126, 128 may be a standalone application, or may be an applet/application/script/extension that may interact with and/or be executed within and/or be a component of callback process 110 and/or collaboration application 120. Examples of client applications 122, 124, 126, 128 may include, but are not limited to, e.g., a VR application, XR or MR application, an AR application, a web conferencing application, a video conferencing application, a telephony application, a voice-over-IP application, a video-over-IP application, an Instant Messaging (IM)/"chat" application, a chatbot application, an interactive voice response (IVR) application, a short messaging service (SMS)/multimedia messaging service (MMS) application, a subscription based messaging service, an electronic mail (email) application, or other application that allows for remote collaboration and/or messaging, a standard and/or mobile web browser, an email application (e.g., an email client application), a textual and/or a graphical user interface, a customized web browser, a plugin, an Application Programming Interface (API), or a custom application. The instruction sets and subroutines of client applications 122, 124, 126, 128, which may be stored on storage devices 130, 132, 134, 136, may be executed by one or more processors and one or more memory architectures incorporated into client electronic devices 138, 140, 142, 144.

In some implementations, one or more of storage devices 130, 132, 134, 136, may include but are not limited to: hard disk drives; flash drives, tape drives; optical drives; RAID arrays; random access memories (RAM); and read-only memories (ROM). Examples of client electronic devices 138, 140, 142, 144 (and/or computer 112) may include, but are not limited to, a personal computer (e.g., client electronic device 138), a laptop computer (e.g., client electronic device 140), a smart/data-enabled, cellular phone (e.g., client electronic device 142), a notebook computer (e.g., client electronic device 144), a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone/speaker (such as those embedded within eyeglasses, smart phones, tablet computers, smart televisions, smart speakers, watches, etc.), an infotainment device (e.g., such as those found in vehicles combining information and/or entertainment with optional screens and/or audio for such things as navigation, multimedia, connectivity, voice control, smartphone integration, touchscreen interface, internet and apps, rear-seat entertainment, etc.), a dedicated network device, and combinations thereof. Client electronic devices 138, 140, 142, 144 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 122, 124, 126, 128 may be configured to effectuate some or all of the functionality of callback process 110 (and vice versa). Accordingly, in some implementations, callback process 110 may be a purely server-side application, a purely client-side application, or a hybrid server-side/client-side application that is cooperatively executed by one or more of client applications 122, 124, 126, 128 and/or callback process 110.

In some implementations, one or more of client applications 122, 124, 126, 128 may be configured to effectuate some or all of the functionality of collaboration application 120 (and vice versa). Accordingly, in some implementations, collaboration application 120 may be a purely server-side application, a purely client-side application, or a hybrid server-side/client-side application that is cooperatively executed by one or more of client applications 122, 124, 126, 128 and/or collaboration application 120. As one or more of client applications 122, 124, 126, 128, callback process 110, and collaboration application 120, taken singly or in any combination, may effectuate some or all of the same functionality, any description of effectuating such functionality via one or more of client applications 122, 124, 126, 128, callback process 110, collaboration application 120, or combination thereof, and any described interaction (s) between one or more of client applications 122, 124, 126, 128, callback process 110, collaboration application 120, or combination thereof to effectuate such functionality, should be taken as an example only and not to limit the scope of the disclosure.

In some implementations, one or more of users 146, 148, 150, 152 may access computer 112 and callback process 110 (e.g., using one or more of client electronic devices 138, 140, 142, 144) directly through network 114 or through network 118. Further, computer 112 may be connected to network 114 through network 118, as illustrated with phantom link line 154. Callback process 110 may include one or more user interfaces, such as browsers and textual or graphical user interfaces, through which users 146, 148, 150, 152 may access callback process 110.

In some implementations, the various client electronic devices may be directly or indirectly coupled to network 114 (or network 118). For example, client electronic device 138 is shown directly coupled to network 114 via a hardwired network connection. Further, client electronic device 144 is shown directly coupled to network 118 via a hardwired network connection. Client electronic device 140 is shown wirelessly coupled to network 114 via wireless communication channel 156 established between client electronic device 140 and wireless access point (i.e., WAP 158), which is shown directly coupled to network 114. WAP 158 may be, for example, an IEEE 802.11a, 802.11b, 802.11g, 802.11n, 802.11ac, Wi-Fi®, RFID, and/or Bluetooth™ (including Bluetooth™ Low Energy) or any device that is capable of establishing wireless communication channel 156 between client electronic device 140 and WAP 158 (e.g., Zigbee, Z-Wave, etc.). Client electronic device 142 is shown wirelessly coupled to network 114 via wireless communication channel 160 established between client electronic device 142 and cellular network/bridge 162, which is shown by example directly coupled to network 114.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used. In some implementations, computer 112 may be directed or controlled by an operator. Computer 112 may be hosted by one or more of assets owned by the operator, assets leased by the operator, and third-party assets. The assets may be referred to as a private, community, or hybrid cloud computing network or cloud computing environment. For example, computer 112 may be partially or fully hosted by a third-party offering software as a service (SaaS), platform as a service (PaaS), and/or infrastructure as a service (IaaS). Computer 112 may be implemented using agile development and operations (DevOps) principles. In some implementations, some or all of computer 112 may be implemented in a multiple-environment architecture. For example, the multiple environments may include one or more production environments, one or more integration environments, one or more development environments, etc.

In some implementations, various I/O requests (e.g., I/O request 115) may be sent from, e.g., client applications 122, 124, 126, 128 to, e.g., computer 112 (and vice versa). Examples of I/O request 115 may include but are not limited to, data write requests (e.g., a request that content be written to computer 112) and data read requests (e.g., a request that content be read from computer 112). Client electronic devices 138, 140, 142, 144 and/or computer 112 may also communicate audibly using an audio codec, which may receive spoken information from a user and convert it to usable digital information. An audio codec may likewise generate audible sound for a user, such as through a speaker, e.g., in a handset of a client electronic device. Such sound may include sound from voice telephone calls, may include recorded sound (e.g., voice messages, music files, etc.) and may also include sound generated by applications operating on the client electronic devices.

Figure 2:
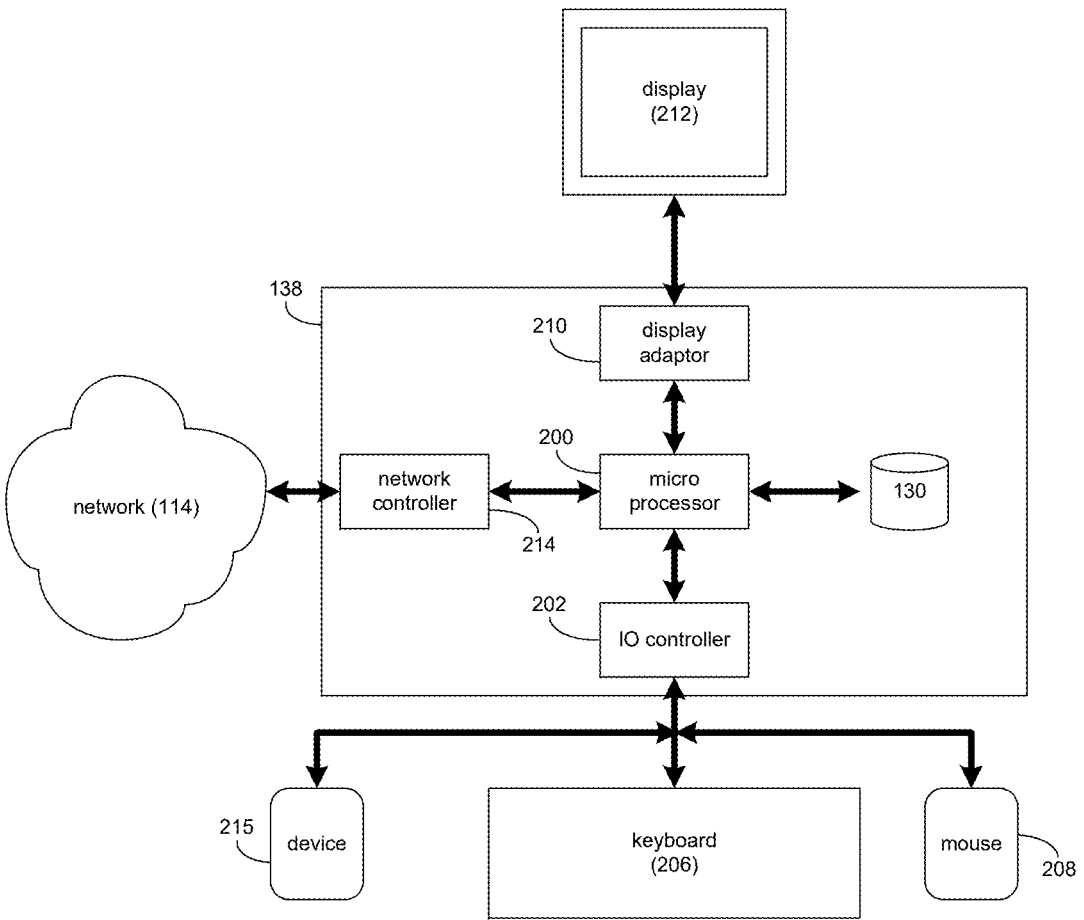
FIG. 2 is an example diagrammatic view of a computing device of FIG. 1 according to one or more example implementations of the disclosure.

Referring also to the example implementation of FIG. 2, there is shown a diagrammatic view of client electronic device 138. While client electronic device 138 is shown in this figure, this is for example purposes only and is not intended to be a limitation of this disclosure, as other configurations are possible. Additionally, any computing device capable of executing, in whole or in part, callback process 110 may be substituted for client electronic device 138 (in whole or in part) within FIG. 2, examples of which may include but are not limited to computer 112 and/or one or more of client electronic devices 140, 142, 144.

In some implementations, client electronic device 138 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 130). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), scanner, custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to network 114 (e.g., the Internet or a local area network).

As noted above, when a client is requesting information from a service provider, that information may not yet be known. Typically, when that happens, the request for information may get timed out, or an error message may be received. Continuously sending requests for the information until it is known, and a proper response may be received may drain available resources and may be frustrating for the requestor. Therefore, as will be discussed in greater detail below, the present disclosure may enable a subscription service to be altered, such that information may be sent to a requesting client upon a predetermined event (e.g., receipt of that information once known).

As will be discussed below, callback process 10 may at least help, e.g., improve network technology, necessarily rooted in computer technology, in order to overcome an example and non-limiting problem specifically arising in the realm of computer networks and improve existing technological processes associated with, e.g., asynchronous callback systems being integrated into the practical application of enabling requestors to have their requests processed asynchronously when the requested data is not yet known. It will be appreciated that the computer processes described throughout are integrated into one or more practical applications, and when taken at least as a whole are not considered to be well-understood, routine, and conventional functions.

Figure 4:
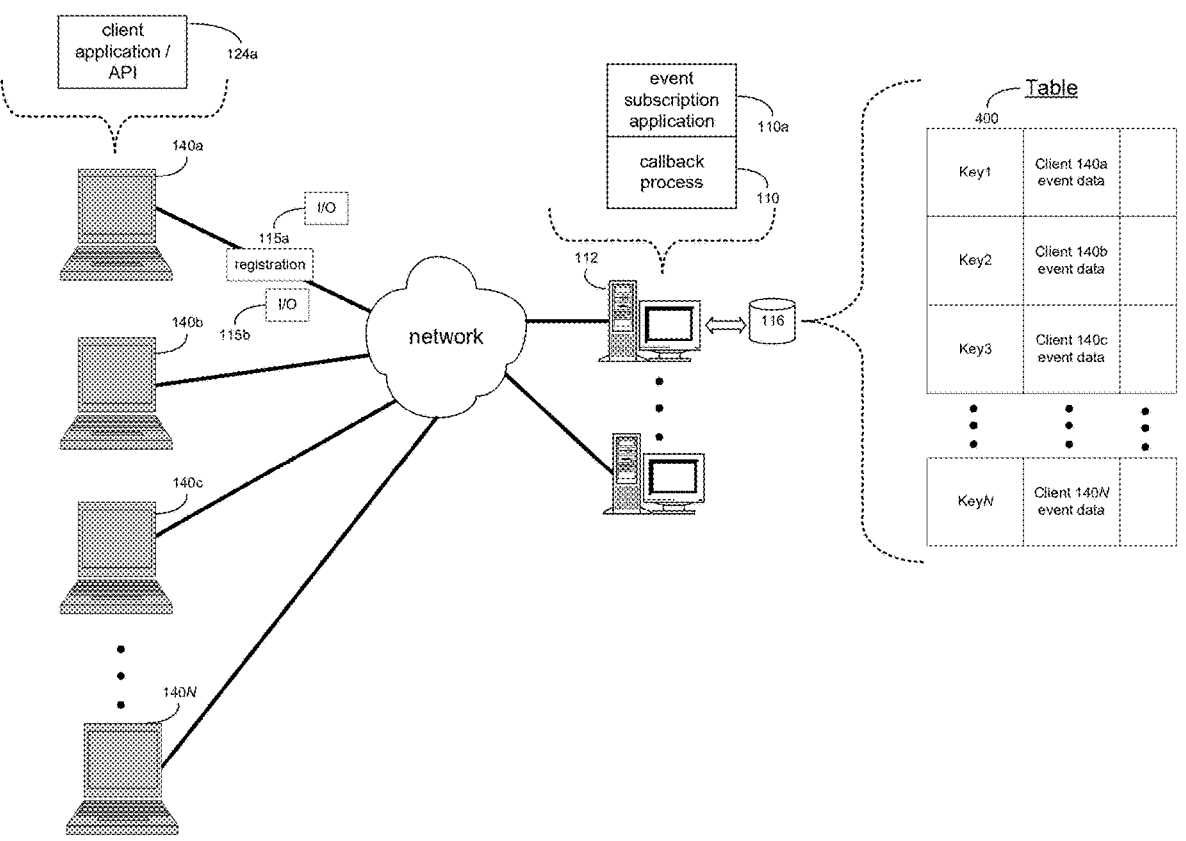
FIG. 4 is an example diagrammatic view of an example computing network and table according to one or more example implementations of the disclosure.

The Callback Process:

As discussed above and referring also at least to the example implementations of FIGS. 3-4, callback process 110 may receive 300, at a computing device, a request for data from a client electronic device. Callback process 110 may determine 302 that the data is not currently available upon receiving the request for the data. Callback process 110 may determine 304 that an event associated with the data has been triggered, wherein the event indicates availability of the data. Callback process 110 may transmit 306 a message containing the data to the client electronic device, wherein the message containing the data is asynchronously transmitted to the client electronic device based upon, at least in part, triggering of the event.

In some implementations, callback process 110 may receive 300, at a computing device, a request for data from a client electronic device. For instance, a computing device (e.g., computer 112) may receive a request for data (e.g., IO 115) from a client electronic device (e.g., client electronic device 140a). As an example, client electronic device 140a may send quotes for processing to computer 112, where the desired response is with Premium Finance Account number (s) using an account book event at a later point in time; however, due to the nature of this business cycle, some processing can be delayed.

In some implementations, the request for data may be sent from an application programming interface (API) of the client electronic device and received by an API of the computing device. For instance, APIs often follow certain standards and protocols, ensuring that different systems can interact in a standardized way. This may be beneficial in industries like finance and healthcare, where compliance with regulations is important. As such, in the example, computer 112 (e.g., via callback process 110) may have its own API, and client electronic device 140a (e.g., via client applications 124a) may have its own API, which may handle the requests and replies respectively in accordance with their own protocols.

In some implementations, callback process 110 may determine 302 that the data is not currently available upon receiving the request for the data. For instance, as noted above, due to the nature of some business cycles, bandwidth, connectivity, or other system resources, etc. some processing and/or responses to requests can be delayed. In such a case, when client electronic device 140a invokes the API of computer 112a, and if computer 112a is unable to respond immediately with the right information, callback process 110 may request client electronic device 140a subscribe to event subscriptions (e.g., via event subscription application 110a), where a response to the original request may be sent back to client electronic device 140a asynchronously (i.e., task performed independently of the main program flow, allowing the system to handle other operations while waiting for a particular task to complete, such as sending the response.). An example of asynchronicity may include an asynchronous operation, where a task is initiated, and the program does not wait for the task to finish before moving on to other tasks. This non-blocking nature ensures that the system remains responsive and can perform other actions simultaneously. Other examples include callbacks and promises, where callbacks, promises, or async/await syntax (in languages like JavaScript), which allow the program to define actions that should occur once the asynchronous task completes, without halting the execution of subsequent code.

It will be appreciated that various techniques may be used by callback process 110 to determine that the data is not currently available upon receiving the request for the data. For instance, techniques may include polling (e.g., the client repeatedly requests the data at regular intervals until it becomes available), synchronous response codes, where computer 112a, such as a server, may immediately respond to client electronic device 140a's request with a status code indicating that the data is not yet available (e.g., an HTTP server might respond with a "202 Accepted status code" to indicate that the request has been accepted but processing is not complete), asynchronous callbacks, where the client registers a callback function with the server, and the server calls this function once the data is available (e.g., a client might use an asynchronous function and provide a callback to be executed when data is ready as discussed throughout), promises and futures, where in asynchronous programming, a promise or future is an object that represents a value that may not be available yet but will be resolved in the future (e.g., fetch returns a promise that resolves when the data is available), WebSocket and long polling, where persistent connections between the client and server, allowing the server to push data to the client as soon as it becomes available (e.g., a WebSocket connection where the server sends data to the client when it's ready, or long polling where the server holds the request open until data is available), message queues, where callback process 110 may use message queues where the client subscribes to a queue and waits for messages that contain the requested data, as discussed throughout (e.g., a client subscribes to an AWS SQS queue and processes messages as they arrive), Event-Driven Architecture, where callback process 110 may be designed to emit and listen for events, and when the requested data is ready, an event is emitted (e.g., an application uses an event bus, and a consumer service listens for an event that indicates data readiness), HTTP Headers and Metadata, where the server includes specific headers or metadata in the response to indicate that the data is not yet available and might include information on when to retry (e.g., using the Retry-After HTTP header to tell the client when to make another request), database or cache miss, where callback process 110 may check the datastore or cache and determine that the data is not available (e.g., a cache miss in a Redis cache prompts the system to fetch data from a slower data store or indicate to the client that the data is not yet ready), API Rate Limiting and Quotas, where the server informs the client that it has reached its quota or rate limit and the requested data cannot be processed at the moment (e.g., returning an "HTTP 429 Too Many Requests" status code with information on when the client can retry.

In some implementations, callback process 110 may execute the polling by client-side code running on user devices (e.g., laptops, smartphones, etc.) that repeatedly requests data from web servers, may execute Synchronous Response Codes managed by application servers responding to HTTP requests with appropriate status codes, may execute asynchronous callbacks with application servers using, e.g., WebSocket connections or long-polling techniques to notify clients, may execute promises and futures handled in the application logic, typically running on servers or client-side devices, may execute the WebSockets using dedicated WebSocket servers maintaining persistent connections, may execute message queues using servers facilitating event-driven communication, may execute Event-Driven Architecture by using message brokers and event buses, supported by application servers and infrastructure, may execute datastore or cache misses by using datastore and cache servers as managers, with cache servers providing quick access to data and signaling cache misses, and may execute Key Management by implementing secure key handling and cryptographic operations.

In the example, assume that computer 112*a* is unable to provide the requested information upon receiving the request (e.g., I/O 115). Computer 112*a* may then request that client electronic device 140*a* register for a subscription to receive a response once the information is known. For example, client electronic device 140*a* may receive a link to register their URL (or other identifying information) where client electronic device 140*a* would like to receive responses back. Similarly, client electronic device 140*a* may also subscribe to multiple events, which may be selected from a list of events that are published (e.g., via callback process 110) for display by client electronic device 140*a*. In some implementations, as will be discussed in greater detail below, a subscription code (e.g., a key) may be generated by callback process 110 during this subscription process.

In some implementations, the event subscription process of callback process 110 may include event producers (publishers, which may be described generally as the entities that generate events, which can represent anything that happens in the system, such as a user action, a change in state, or the completion of a task, etc.), event consumers (subscribers, which are may be described generally as the entities that subscribe to events of interest, and when an event occurs, subscribers are notified as will be discussed below), and an event bus (message broker, which may be described generally as the communication channel through which events are dispatched from producers to consumers, and may be implemented in various ways, such as an in-memory event dispatcher or a more complex message broker).

As will be discussed in greater detail below, a user of client electronic device 140*a* (i.e., consumers) may express their interest in specific types of events by subscribing to them, which may be done by registering a callback function or handler that will be invoked when the event occurs. When callback process 110 (i.e., the event producer) generates an event, it publishes this event to the event bus. The event may contain data that describes the event and any relevant information requested by the subscribers. The event bus (e.g., via callback process 110) may receive the event and forward it to all subscribed consumers, as discussed in greater detail below. In some implementations, the subscribed consumers (which may also be callback process 110) may receive the event and execute their registered callback functions or handlers, which may contain the logic for how to respond to the event (e.g., sending the requested data to the appropriate client, as discussed in greater detail below).

In some implementations, callback process 110 may determine 304 that an event associated with the data has been triggered, wherein the event indicates availability of the data, and in some implementations, callback process 110 may transmit 306 a message containing the data to the client electronic device, wherein the message containing the data is asynchronously transmitted to the client electronic device based upon, at least in part, triggering of the event. For instance, assume after a period of time that the data originally requested by client electronic device 140*a* is now available and stored in a datastore. In the example, when an event for the client is triggered (e.g., in an associated backend system) resulting from a processing activity specific for the requested data (e.g., the specific data is now stored in a datastore), this triggered event may be queued through a messaging system of callback process 110, and then the data may be delivered back to the client that subscribed to that event. Example events may include, e.g., account booked, account updated, account funded, account cancelled, auto pay enrollment, process executed, process concluded, user input handling, file reading/writing, messages from other systems, network events, timer events, system events, custom events, hardware events, database events—such as database updates, etc.). It will be appreciated after reading the present disclosure that the above-noted techniques and architectures used for determining that the data is not currently available may be used by callback process 110 with their corresponding techniques for event detection and notification.

In some implementations, the message containing the data may be transmitted to the client electronic device at a location indicated during an event registration process of the client electronic device. For instance, as noted above, the registration process may include the user selecting the desired events, as well as requesting the location information (e.g., URL) of client electronic device 140*a*, and/or other client data (e.g., IP address, Unique Identifiers, etc.). Thus, even if multiple clients are subscribing to the same event, the requested data is only delivered to the relevant client.

In some implementations, transmitting the message containing the data may include encrypting 308 the message using a security key. For example, callback process 110 may include security features to ensure the messages/data are not altered in transit and can be verified by client electronic device 140*a*. For instance, various hashing (or other encryption techniques) may be implemented such that only the intended client receives the message/data. In some implementations, the security key may be generated during the event registration process of the client electronic device, and in some implementations, the request for the data may include the security key. For instance, as discussed above, when client electronic device 140*a* initially calls the API of callback process 110, client electronic device 140*a* may generate and send in a token (e.g., the above-noted subscription code) with the request (e.g., I/O 115*a*) to callback process 110 that may be temporarily retained. Callback process 110 may then use this token (or other type of security key) to encrypt the message/data (e.g., I/O 115*b*) sent back to client electronic device 140*a* at a later point in time after the event detection. In some implementations, these may be one time use tokens.

In some implementations, the key may be a symmetric keys (e.g., a single key is used for both encryption and decryption, such as AES (Advanced Encryption Standard), DES (Data Encryption Standard), 3DES (Triple DES), etc., asymmetric keys (e.g., Public/Private Key Pairs, that use a pair of keys—one public key for encryption and one private key for decryption, such as RSA (Rivest-Shamir-Adleman), ECC (Elliptic Curve Cryptography), etc. hash keys (e.g., not encryption keys per se, but cryptographic hash functions produce a fixed-size hash value from input data, such as SHA-256 (Secure Hash Algorithm 256-bit), MD5 (Message Digest Algorithm 5), etc., key derivation keys (e.g., derived from a master key or a password to generate keys for specific encryption purposes, such as PBKDF2 (Password-Based Key Derivation Function 2), bcrypt, scrypt, etc., session keys (e.g., temporary keys used for a single session or transaction, such as keys generated for each HTTPS session, etc.), master keys (e.g., keys used to generate and manage other keys within a cryptographic system, such as keys used in key management systems (KMS), hardware security modules (HSMs), etc., key management (e.g., Key Exchange Algorithms, which are secure methods for exchanging cryptographic keys over an insecure channel (e.g., Diffie-Hellman), where Key Management Systems may use tools and protocols for secure generation, distribution, storage, and rotation of cryptographic keys.

In some implementations, transmitting the message containing the data may further include matching 310 the security key to the location indicated during the event registration process of the client electronic device. For instance, and referring still at least to the example implementation of FIG. 4, an example table (e.g., table 400) is shown. In the example, table 400 (or other data structure) may include various fields, which may link the above-noted key (e.g., session code) to the specific client (e.g., client electronic device 140*a*, client electronic device 140*b*, client electronic device 140*c*, etc. via matching the appropriate key to the associated client's URL) and/or the specific event requested/subscribed to for that client. For instance, each key is associated in table 400 with specific client data (e.g., the client identifier, their URL, the subscribed event associated with the key, etc.). Thus, when an event is triggered, callback process 110 may match the subscribed event with the proper client and the proper key, which may be sent back to client electronic device 140*a* in the response with the data or sent separately for added security. Client electronic device 140*a* may then decrypt the message/data with the key originally sent to callback process 110 during the registration process.

It will be appreciated after reading the present disclosure that more or less fields may be used in table 400, and that various data structures may be used in place of (or in addition to) table 400. Therefore, the use of the specific fields and structure of table 400 should be taken as example only and not to otherwise limit the scope of the present disclosure.

In some implementations, callback process 110 may support multiple authentication mechanisms in addition to (or in place of) the one described above. Non-limiting examples may include, e.g., OAuth Token to communicate back to the clients, Basic Auth, and certification Auth. Therefore, it will be appreciated after reading the present disclosure that various authentication mechanisms may be used without departing from the scope of the present disclosure.

The terminology used herein is for the purpose of describing particular implementations only and is not intended to be limiting of the disclosure. As used herein, the singular forms "a", "an" and "the" are intended to include the plural forms as well, including any steps performed by a/the computer/processor, unless the context clearly indicates otherwise. As used herein, the phrase "at least one of A, B, and C" should be construed to mean a logical (A OR B OR C), using a non-exclusive logical OR, and should not be construed to mean "at least one of A, at least one of B, and at least one of C." As another example, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof. Example sizes/models/values/ranges can have been given, although examples are not limited to the same.

The terms (and those similar to) "coupled," "attached," "connected," "adjoining," "transmitting," "communicating," "receiving," "connected," "engaged," "adjacent," "next to," "on top of," "above," "below," "abutting," and "disposed," used herein is to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action is to occur, either in a direct or indirect manner. The term "set" does not necessarily exclude the empty set—in other words, in some circumstances a "set" may have zero elements. The term "non-empty set" may be used to indicate exclusion of the empty set—that is, a non-empty set must have one or more elements, but this term need not be specifically used. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

The corresponding structures, materials, acts, and equivalents (e.g., of all means or step plus function elements) that may be in the claims below are intended to include any structure, material, or act for performing the function in combination with other claimed elements as specifically claimed. While the disclosure describes structures corresponding to claimed elements, those elements do not necessarily invoke a means plus function interpretation unless they explicitly use the signifier "means for." Unless otherwise indicated, recitations of ranges of values are merely intended to serve as a shorthand way of referring individually to each separate value falling within the range, and each separate value is hereby incorporated into the specification as if it were individually recited. While the drawings divide elements of the disclosure into different functional blocks or action blocks, these divisions are for illustration only. According to the principles of the present disclosure, functionality can be combined in other ways such that some or all functionality from multiple separately-depicted blocks can be implemented in a single functional block; similarly, functionality depicted in a single block may be separated into multiple blocks. Unless explicitly stated as mutually exclusive, features depicted in different drawings can be combined consistent with the principles of the present disclosure. Moreover, although this disclosure describes and depicts respective implementations herein as including particular components, elements, feature, functions, operations, or steps (and arrangements thereof), any of these implementations may include any combination, arrangement, or permutation of any of the components, elements, features, functions, operations, or steps described or depicted anywhere herein that a person having ordinary skill in the art would comprehend after reading the present disclosure. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The description of the present disclosure has been presented for purposes of illustration and description but is not intended to be exhaustive or limited to the disclosure in the form disclosed. After reading the present disclosure, many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated. The features of any dependent claim may be combined with the features of any of the independent claims or other dependent claims.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, comprising:
receiving, at a computing device, a request for data from a client electronic device, the request for data including a security key;
determining that the data is not currently available upon receiving the request for the data;
determining that an event associated with the data has been triggered, wherein the event indicates availability of the data; and
encrypting a message containing the data using the security key and asynchronously transmitting the message to the client electronic device based upon, at least in part, the triggering of the event, wherein the message is asynchronously transmitted to the client electronic device at a location indicated during an event registration process of the client electronic device.

2. The computer-implemented method of claim 1, wherein the request for data is sent from an application programming interface (API) of the client electronic device and received by an API of the computing device.

3. The computer-implemented method of claim 1, wherein asynchronously transmitting the message containing the data further includes matching the security key to the location indicated during the event registration process of the client electronic device.

4. The computer-implemented method of claim 1, wherein the security key is generated during the event registration process of the client electronic device.

5. A computer program product residing on a non-transitory computer readable storage medium having a plurality of instructions stored thereon which, when executed across one or more processors, causes at least a portion of the one or more processors to perform operations comprising:
receiving, at a computing device, a request for data from a client electronic device, the request for data including a security key;
determining that the data is not currently available upon receiving the request for the data;
determining that an event associated with the data has been triggered, wherein the event indicates availability of the data; and
encrypting a message containing the data using the security key and asynchronously transmitting the message to the client electronic device based upon, at least in part, the triggering of the event, wherein the message is asynchronously transmitted to the client electronic device at a location indicated during an event registration process of the client electronic device.

6. The computer program product of claim 5, wherein the request for data is sent from an application programming interface (API) of the client electronic device and received by an API of the computing device.

7. The computer program product of claim 5, wherein asynchronously transmitting the message containing the data further includes matching the security key to the location indicated during the event registration process of the client electronic device.

8. The computer program product of claim 5, wherein the security key is generated during the event registration process of the client electronic device.

9. A computing system including one or more processors and one or more memories configured to perform operations comprising:
receiving, at a computing device, a request for data from a client electronic device, the request for data including a security key;
determining that the data is not currently available upon receiving the request for the data;
determining that an event associated with the data has been triggered, wherein the event indicates availability of the data; and
encrypting a message containing the data using the security key and asynchronously transmitting the message to the client electronic device based upon, at least in part, the triggering of the event, wherein the message is asynchronously transmitted to the client electronic device at a location indicated during an event registration process of the client electronic device.

10. The computing system of claim 9, wherein the request for data is sent from an application programming interface (API) of the client electronic device and received by an API of the computing device.

11. The computing system of claim 9, wherein asynchronously transmitting the message containing the data further includes matching the security key to the location indicated during the event registration process of the client electronic device.

12. The computing system of claim 9, wherein the security key is generated during the event registration process of the client electronic device.

* * * * *